United States Patent [19]
Ueda et al.

[11] Patent Number: 5,796,470
[45] Date of Patent: Aug. 18, 1998

[54] FREQUENCY SHIFTER AND OPTICAL DISPLACEMENT MEASURING APPARATUS USING THE FREQUENCY SHIFTER

[75] Inventors: Shinji Ueda, Utsunomiya; Hidejiro Kadowaki, Yokohama; Makoto Takamiya, Tokyo; Shigeki Kato, Utsunomiya, all of Japan

[73] Assignee: Canon Kabushiki Kaisha, Tokyo, Japan

[21] Appl. No.: 607,115

[22] Filed: Feb. 26, 1996

[30] Foreign Application Priority Data

Feb. 28, 1995 [JP] Japan ............................ 7-066993
May 12, 1995 [JP] Japan ............................ 7-114563

[51] Int. Cl.[6] .................... G01P 03/36; G02F 01/35
[52] U.S. Cl. .................... 356/28.5; 356/356; 359/326
[58] Field of Search ................. 356/28.5, 356, 356/358; 359/245, 278, 279, 326

[56] References Cited

U.S. PATENT DOCUMENTS

| Re. 35,240 | 5/1996 | Heywood et al. | 359/245 |
|---|---|---|---|
| 5,347,357 | 9/1994 | Nourrcier, Jr. | 356/5 |
| 5,483,332 | 1/1996 | Takamiya et al. | 356/28.5 |
| 5,502,466 | 3/1996 | Kato et al. | 356/356 |
| 5,629,793 | 5/1997 | Takamiya et al. | 359/278 |
| 5,644,422 | 7/1997 | Bortz et al. | 359/326 |

OTHER PUBLICATIONS

R. Foord et al., "A solid-state electro-optic phase modulator for laser Doppler anemometry", J. Phys. D: Appl. Phys., vol. 7, L36-L39 (1974).

J.D. Zook, et al., "Temperture Dependence and Model of the Electro-Optic Effect in LiNbO$_3$", Applied Physics Letters, vol. 11, No. 5, pp. 159-161 (1967).

*Primary Examiner*—Mark Hellner
*Attorney, Agent, or Firm*—Fitzpatrick, Cella, Harper & Scinto

[57] ABSTRACT

Disclosed is a frequency shifter for shifting a frequency of incident light beams. The frequency shifter has an electro-optic element for making incident the light beam whose frequency is to be shifted, an electrode unit disposed on the electro-optic element, an electric charge imparting circuit for imparting an electric charge to the electrode unit and a discharging circuit for discharging the electric charges accumulated in the electrode unit. Disclosed also is an apparatus, having the frequency shifter, for optically measuring relative displacement data to a measured object.

24 Claims, 13 Drawing Sheets

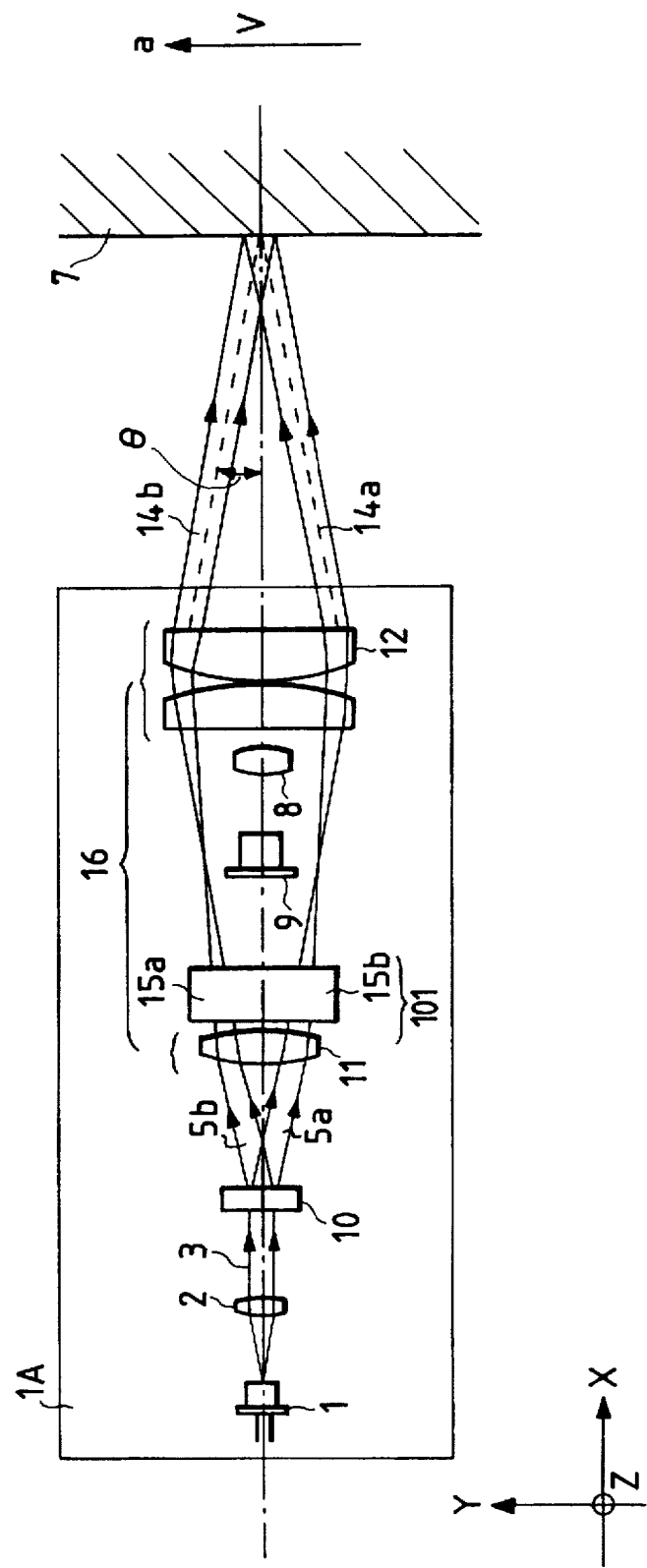

VARIATION IN TEMPERATURE OF Ne

VARIATION IN TEMPERATURE OF $\varepsilon_{11}$ AND $\varepsilon_{33}$ (BY Nassau)

DEPENDENCE OF ONE PHASE DRIVING VOLTAGE IN ELECTRO-OPTIC CRYSTAL OF $LiNbO_3$ (THICKNESS 1mm, LENGTH 20mm AND WIDTH 10mm) ON TEMPERATURE

DEPENDENCE OF CAPACITY VALUE IN ELECTRO-OPTIC CRYSTAL OF LiNbO₃ (THICKNESS 2mm, LENGTH 20mm AND WIDTH 10mm) ON TEMPERATURE

FREQUENCY SHIFTER AND OPTICAL DISPLACEMENT MEASURING APPARATUS USING THE FREQUENCY SHIFTER

BACKGROUND OF THE INVENTION

1. Field of the Invention

The present invention relates generally to an optical displacement measuring apparatus and, more particularly, to an optical displacement measuring apparatus suitable for measuring displacement data about a moving velocity, a moved distance, or the like of a moving object and a moving fluid (hereinafter referred to as a "moving object") in a non-contact manner with a high accuracy by detecting a shift of a frequency of a laser beam.

2. Related Background Art

As an apparatus for measuring displacement data of a moving object in a non-contact manner with a high accuracy, there has hitherto been employed an optical displacement measuring apparatus such as a laser Doppler velocimeter (LDV) and a laser encoder. The laser Doppler velocimeter measures a moving velocity of the moving object by making use of an effect (Doppler effect) wherein the moving object is irradiated with laser beams, a frequency of the laser beams scattered by the moving object shifts in proportion to the moving velocity.

FIG. 1A is a view schematically illustrating the principal portion of a prior art laser Doppler velocimeter. Referring to FIG. 1A, the reference symbol 1A designates a measuring head of the velocimeter. A light source 1 is constructed of, e.g., a laser diode or a semiconductor laser (hereinafter termed a laser). Shown also are a collimator lens 2 and a transmitting type diffraction grating 10 constructed to generate ±1st-order diffracted light beams at a diffraction pitch p on the order of 3.2 μm at a diffraction angle $\theta_1$ ($\theta_1$=12°).

An optical system 16 is constructed of lens element groups 11, 12 (hereinafter collectively called lens units) each consisting of a single lens or a plurality of lenses. Focal distances of the two lens units are approximately equal to each other. Further, an interval between the two lens units on the principal plane is equal to a double of the focal distance. The numeral 7 represents a moving object, and it is assumed that the moving object 7 is moving in an arrowed direction (a) at a velocity V. Shown also are a condenser lens 8 and a photodetector 9.

The operation of this prior art will be explained. Laser beams emitted from the laser diode 1 are collimated by the collimator lens 2 into parallel beams 3. The parallel beams 3 are diffracted by the diffraction grating 10 into ±1st-order diffracted beams 5a and 5b. The ±1st-order diffracted beams 5a, 5b are condensed by a lens unit 11 into beams 13a, 13b. Subsequently, the condensed beams 13a, 13b are refracted by the lens unit 12 into parallel beams 14a, 14b and emerge from the measuring head 1A. The moving object 7 is then irradiated with those parallel beams 14a, 14b at an irradiation angle θ equal to the diffraction angle of the diffraction grating 10.

Scattered beams from the moving object 7's area irradiated with the beams are detected by the photo-detector 9 through the condenser lens 8.

Frequencies of the scattered beams of the two light beams respectively undergo Doppler shifts of +Δf, -Δf in proportion to the moving velocity V. The doppler shift Δf is expressed by the following formula:

$$\Delta f = V \cdot \sin(\theta)/\lambda \qquad (1)$$

where λ is the wavelength of the laser beam.

The scattered beams receiving the Doppler shifts +Δf, -Δf interfere with each other to cause changes in brightness on the light receiving surface of the photo-detector 9, and a frequency F of the brightness is given by the following formula:

$$F = 2 \cdot \Delta f = 2 \cdot V \cdot \sin(\theta)/\lambda \qquad (2)$$

Accordingly, the velocity V of the measured object 7 is obtained from the formula (2) by measuring the frequency F (hereinafter termed a Doppler frequency) of the signal detected by the photodetector 9. This is the description how the conventional laser Doppler velocimeter operates.

A conditional equation of the diffraction by the diffraction grating 10 is given such as sin(θ)=λ/d (d is the grating pitch of the grating 10). From this conditional equation, the formula (2) is:

$$F = 2 \cdot V/d \qquad (2)'$$

The Doppler frequency F does not depend on the laser wavelength λ. Namely, variations in terms of the laser wavelength λ are compensated by the diffraction angle and an incident angle θ.

In general, when the object is irradiated with high-coherence beams of the laser or the like, the scattered beams receive phase modulations at random due to fine irregularity on the surface of the object, with the result that so-called speckled patterns are formed on the observation surface.

In the laser Doppler velocimeter, when the moving object moves, it follows that the variations in the brightness due to the Doppler shift on the detection surface of the photodetector 9 are modulated by random variations in brightness due to a flow of the speckled patterns.

Further, the scattered beams incident on the photodetector 9 are modulated also due to changes in transmissivity (or reflectivity) of the measured object 7.

According to the conventional laser Doppler velocimeter, a frequency of the variation in the brightness due to the flow of the speckled patterns and a frequency of the change in the transmissivity (or reflectivity) of the measured object 7 are generally lower than the Doppler frequency F shown in the formula (2). Hence, there is well used a method of taking only the Doppler signal F by making an output of the photodetector 9 pass through a high-pass filter and thus electrically eliminating those low frequency components.

There arises, however, the following problem. If both the velocity V of the measured object 7 and the Doppler frequency F are low, a frequency difference from a low frequency fluctuation component decreases, and the high-pass filter can not be used. The velocity V of the measured object 7 can not be therefore measured. Further, the above-described prior art laser Doppler velocimeter is incapable of detecting a direction of the velocity in principle.

Foord, et al (R. Foord, A. F. Harvey, R. Jones, E. R. Pike and J. M. Vaugham, J. Phys. D: Apply. Phys., Vol. 7, 1974, 136–139) disclosed a method of detecting a moving direction of the moving object and even a velocity approximate to 0 by placing the frequency shifters each using an electro-optic element represented by, e.g., an electro-optic crystal flat plate on optical paths for two light beams and giving a frequency difference between the two light beams in the laser Doppler velocimeter.

FIG. 1B is a view schematically illustrating the principal portion of the laser Doppler velocimeter exploiting the principle thereof. Referring to FIG. 1B, a frequency shifter 100 comprises electro-optic elements 15a, 15b and a driving circuit 30 therefor.

The operation of this laser Doppler velocimeter will be explained. The parallel beams from the light source 1 are split by a beam splitter 4 into two light beams 5a, 5b. The respective light beams penetrate the electro-optic elements 15a, 15b, respectively. On this occasion, the electro-optic element 15a receives such a serrate wave voltage drive (serodyne drive) that a voltage amplitude corresponds to an optical phase E from the drive circuit 30 and gives a frequency shift to the light beam 5a. Similarly, the light beam 5b is also frequency-shifted by the serrate wave voltage drive of the electro-optic element 15b. The two light beams each receiving the frequency shift are deflected by a lens 31, and the moving object 7 is irradiated with the two light beams at an irradiation angle θ.

Scattered light beams from the moving object 7's portion irradiated with the light beams are detected by a photodetector through an unillustrated condenser lens, and a velocity V and a direction of the moving object are detected.

This construction takes a form which is utilized mainly as a velocimeter and makes it possible to perform measurements including a stationary state of the measured object to a velocity direction as well.

SUMMARY OF THE INVENTION

It is a primary object of the present invention to provide a frequency shifter and an optical displacement measuring apparatus constructed to use this frequency shifter more stable against variations in temperature.

Other objects of the present invention will become apparent during the following discussion in conjunction with the accompanying drawings.

BRIEF DESCRIPTION OF THE DRAWINGS

FIG. 2A is a diagram schematically showing the principal portion in a first embodiment of the present invention.

DETAILED DESCRIPTION OF THE PREFERRED EMBODIMENTS

Figures 2B, 2C:
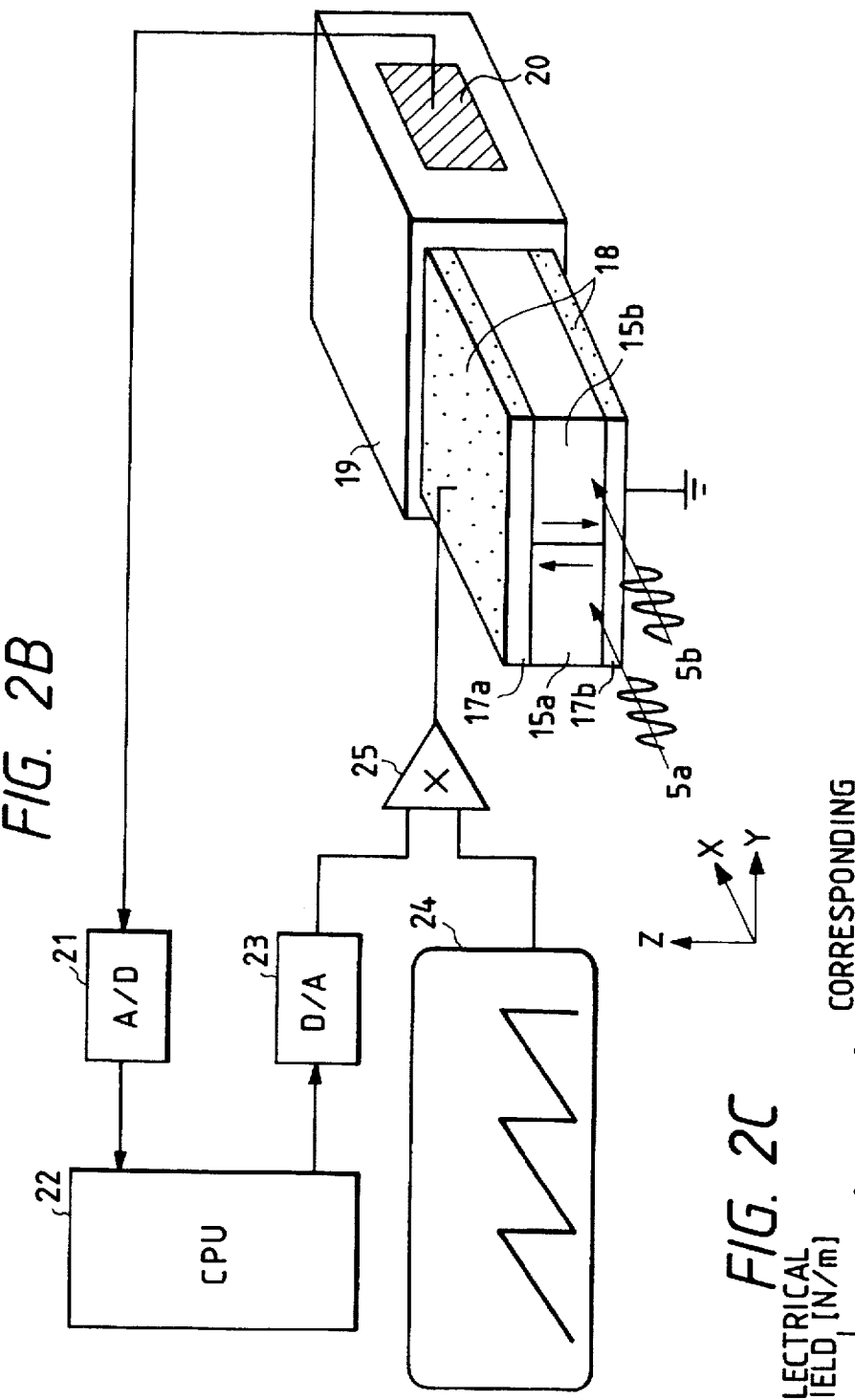
FIG. 2B is an explanatory perspective view showing a frequency shifter in the first embodiment.
FIG. 2C is an explanatory diagram of a serodyne drive.

FIG. 2A is a view schematically illustrating the principal portion in a first embodiment of the present invention. In an illustration of a frequency shifter 101, however, only electro-optic elements 15a, 15b are emphasized. FIG. 2B is an explanatory view of the frequency shifter in the first embodiment.

Referring to FIG. 2A, the symbol 1A denotes a measuring head of a velocimeter. A light source 1 (light source element) is constructed of, e.g., a laser diode or a semiconductor laser (hereinafter termed a laser). Shown also are a collimator lens 2 and a transmitting type diffraction grating 10 constructed to generate ±1st-order diffracted light beams, e.g., at a diffraction pitch p on the order of 3.2 μm at a diffraction angle $\theta_1$ ($\theta_1=12°$). The diffraction grating 10 functions as light splitting means.

An optical system 16 is constructed of lens element groups 11, 12 (hereinafter collectively called lens units) each consisting of a single lens or a plurality of lenses. Note that focal distances of the two lens units are approximately equal to each other, and an interval between the two lens units is equal to a double of the focal distance.

The symbols 15a, 15b represent electro-optic elements. Note that respective electro-optic crystals are disposed so that crystalline axes thereof are, as illustrated in FIG. 2B, set in directions opposite to each other, thus reducing a serodyne voltage.

A moving object 7 is moving at a velocity V in an arrowed direction (a). The numeral 8 designates a condenser lens, and 9 represents a photodetector (detecting means).

Referring to FIG. 2B, the symbols 17a, 17b denote electrodes, and electric fields are applied therethrough to the electro-optic elements 15a, 15b. It is to be noted that an insulator 18 is provided on peripheries of the electrodes. A thermal conductor 19 is composed of copper, etc. serves to uniformly keep temperatures of the electro-optic elements 15a, 15b by enhancing a thermal junction while the insulator 18 electrically insulates the thermal conductor 19 from the electro-optic elements 15a, 15b. Note that the electro-optic elements 15a, 15b and the thermal conductor 19 are illustrated with some shift from each other for explanatory convenience, but, as a matter of fact, the thermal conductor 19 is covered on the upper, lower and side surfaces of the electro-optic element 15.

A temperature detection element 20 (temperature detecting element) is constructed of, e.g., a thermistor and works to detect temperatures of the thermal conductor 19 and, in turn, the electro-optic elements 15a, 15b. The numeral 21 represents an A/D converter, 22 designates a CPU, 23 stands for a D/A converter, 24 denotes a serodyne waveform generator, and 25 indicates a multiplier.

To start with, the operation of the frequency shifter 101 in this embodiment will be explained. FIG. 2B is a perspective view illustrating the principal portion of the frequency shifter in this embodiment.

Each of the electro-optic crystals 15a, 15b is composed of a flat plate of electro-optic crystal LiNbO$_3$. A refractive index of a medium changes due to the electric field to be applied, and hence the electro-optic crystal may include, e.g., trigonal system 3m LiNbO$_3$ and tetragonal system 42m (NH$_4$)H$_2$PO$_4$(ADP), KH$_2$PO$_4$(KDP). The following is an explanation of an example of LiNbO$_3$.

An index ellipsoid of LiNbO$_3$ (3m) is expressed by the following formula:

$$\left( \frac{1}{n_0^2} - \gamma_{22}E_2 + \gamma_{13}E_3 \right) X^2 + \qquad (4)$$

$$\left( \frac{1}{n_0^2} + \gamma_{22}E_2 + \gamma_{13}E_3 \right) Y^2 + \left( \frac{1}{n_e^2} + \gamma_{33}E_3 \right) Z^2 -$$

$$2\gamma_{22}E_1 XY + 2\gamma_{51}E_2 YZ + 2\gamma_{51}E_1 ZX = 1$$

As shown in FIG. 2C, the electric field is applied in a Z-axis direction (E$_3$≠0, E$_1$=E$_2$=0), and, if the X-axis is selected as a light propagating direction, the index ellipsoid within a section given by X=0 is expressed by the following formula:

$$\left( \frac{1}{N_0^2} + \gamma_{13}E_3 \right) Y^2 + \left( \frac{1}{N_e^2} + \gamma_{33}E_3 \right) Z^2 = 1 \qquad (5)$$

where γ is the Pockels constant, and N$_0$, N$_e$ are the refractive indexes of ordinary and extraordinary rays.

From Ne$_e^3\gamma_{33}E_3 \ll 1$, the formula (5) is simplified as follows:

$$\frac{Y^2}{N_0^2 \left( 1 - \frac{1}{2} N_0^2 \gamma_{13}E_3 \right)^2} + \frac{Z^2}{N_e^2 \left( 1 - \frac{1}{2} N_e^2 \gamma_{33}E_3 \right)^2} = 1 \qquad (6)$$

When the Z-axis is selected as a polarizing direction of a light beam 5, the attention may be paid to only Z, and hence the refractive index N(E$_3$) due to the electric field is given by:

$$N(E_3) = N_e \left( 1 - \frac{1}{2} N_e^2 \gamma_{33}E_3 \right) \qquad (7)$$

If a thickness of LiNbO$_3$ is d, a voltage V is given by V=E$_3$d, and a phase difference Γ(V) of the light with respect to a voltage difference after penetrating LiNbO$_3$ having a length (a) is expressed by the following formula:

$$\Gamma(V) = \left( \frac{2\pi}{\lambda} \right) \cdot \left\{ N\left( \frac{V}{d} \right) - N(0) \right\} a = -\frac{\pi N_e^3 \gamma_{33} a}{\lambda d} V \qquad (8)$$

where λ is the wavelength of the light beam 5. Therefore, N$_e^3\gamma_{33}$/(λd) is fixed at a certain temperature. Hence, when the variation voltage V per unit time is fixed, it follows that the light beam after penetrating LiNbO$_3$ has a fixed phase variation quantity per unit time. Namely, that turns out to be a frequency shifter.

Actually, when the voltage is uniformly changed at all times, the voltage becomes infinite, and, therefore, a serrate wave (serodyne) drive as shown in FIG. 2C is to be conducted. On this occasion, this drive is performed with such a value that one voltage amplitude corresponds to an optical phase 2 π so as not to make the optical phase discontinuous at a rising portion.

For example, the wavelength λ of the light beam 5 is set such as λ=780 nm, the thickness (d) of the electro-optic element of LiNbO$_3$ is set such as d=1 nm, and the length (a) is set such as a=20 mm. Then, a voltage amplitude value corresponding to the optical phase 2 π to each of the electro-optic crystals disposed opposite to each other is given by V≅115 V. Let f$_R$ be the serodyne frequency, and the light beam 5 is frequency-shifted by f$_R$.

The above is the explanation how the frequency shifter basically operates.

Figure 3:
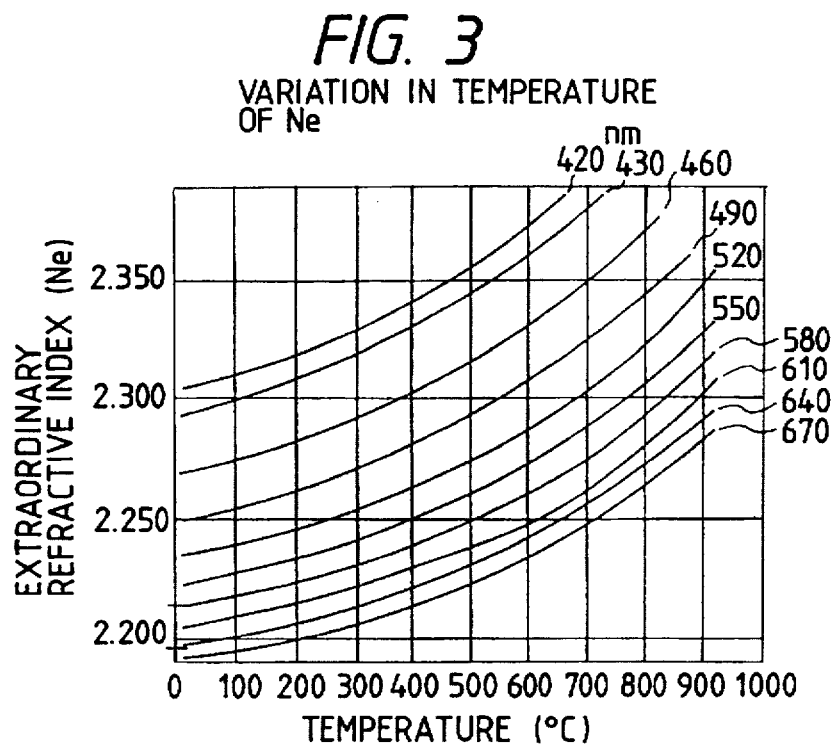
FIG. 3 is a graph showing a temperature dependency of a refractive index Ne of an extraordinary ray of an electro-optical crystal.
Figure 4:
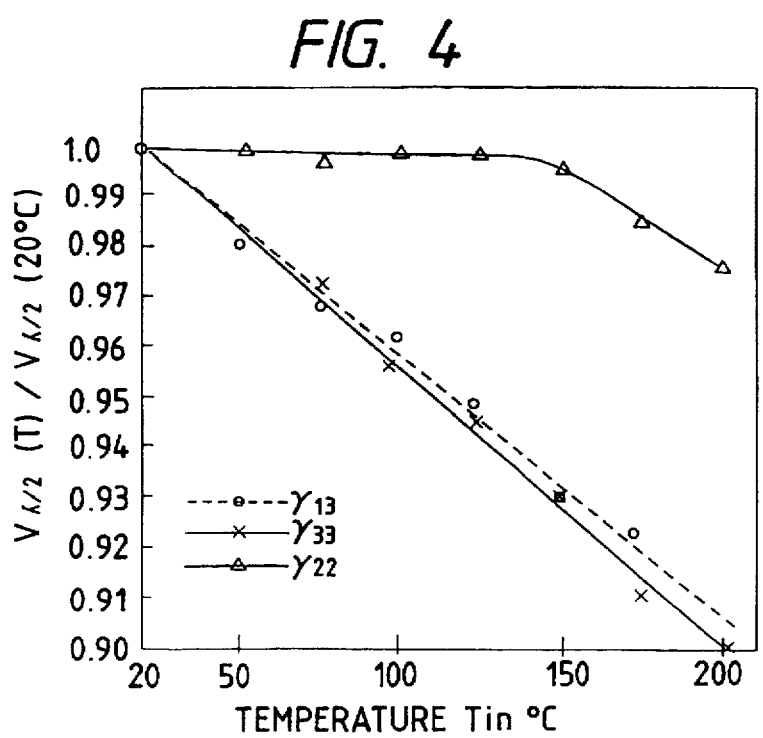
FIG. 4 is a diagram showing the temperature dependency of a Pockels constant $\gamma_{33}$ of the electro-optic crystal.
Figure 5:
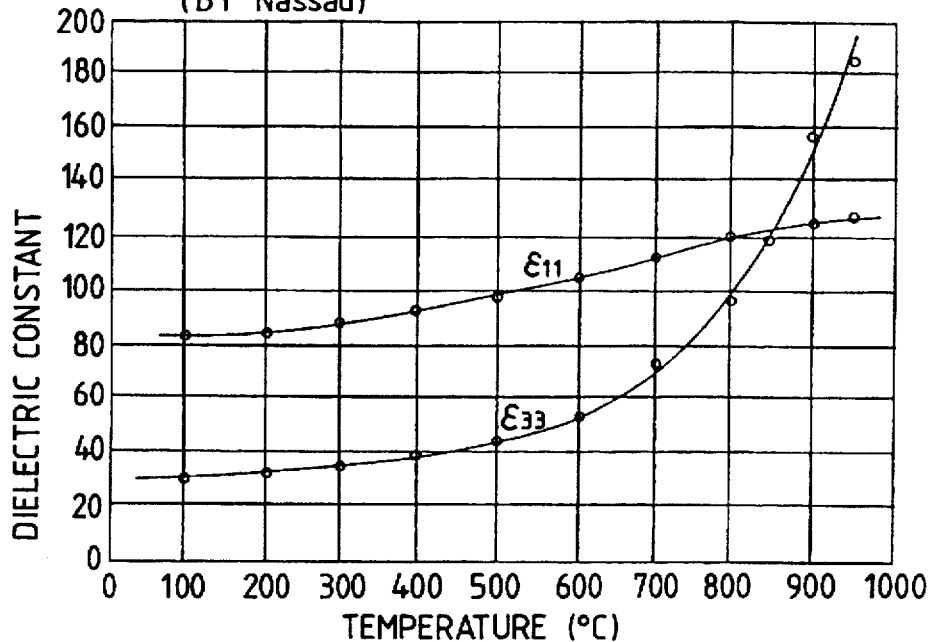
FIG. 5 is a diagram showing the temperature dependency of a dielectric constant $\epsilon_{33}$ of the electro-optic crystal.

However, when using the electro-optic crystal by way of the frequency shifter, the Pockels constant $\lambda_{33}$, the extraordinary refractive index N$_e$ and the dielectric constant $\epsilon_{33}$ of the electro-optic crystal largely change depending on the temperatures. FIG. 3 shows a temperature dependence of the refractive index N$_e$ of the extraordinary rays. FIG. 4 shows a temperature dependence of the Pockels constant $\lambda_{33}$ (Zook, J. D. et al., Appl. Phys. Letters 11, 8, 1967. pp 159–161). FIG. 5 shows a temperature dependence of the dielectric constant $\epsilon_{33}$.

Those characteristic values of the electro-optic crystal change depending on the temperature, and, hence, the apparatus in this embodiment is constructed such that the temperature detecting element 20 detects temperatures of the electro-optic elements 15a, 15b, and the serodyne voltage drive corresponding to the optical phase 2 π is always carried out.

Next, the operation in this embodiment will be described. Referring to FIG. 2A, laser beams emitted from the laser diode 1 are beams which are linearly polarized in the Z-axis direction and then collimated by a collimator lens 2 into parallel beams 3. The parallel beams 3 are diffracted by the diffraction grating 10 into ±1st-order diffracted beams 5a, 5b and respectively incident on the lens unit 11. Then, the diffracted beams become convergent beams through the lens unit 11 and penetrate the electro-optic elements 15a, 15b. At this time, two light beams are frequency-shifted, with the result that a frequency difference f$_R$ is produced. Thereafter, the two light beams, after being condensed, turn out to be divergent light beams and are incident on the lens unit 12. Then, the light beams undergo the refracting action and emerge from the measuring head 1A in the form of light beams 14a, 14b. Then, the moving object 7 is irradiated with the two light beams 14a, 14b at an irradiation angle θ.

Scattered light beams from the moving object 7's area irradiated with the light beams are detected by the photodetector 9 through the condenser lens 8, thereby obtaining a Doppler frequency F.

The obtained Doppler frequency F is expressed by the following formula (3):

The velocity V of the moving object is obtained by use $$F = \left( \frac{2 \cdot V \cdot \sin(\theta)}{\lambda} \right) + f_R \qquad (3)$$

of this formula.

There will be described a method of driving the electro-optic element in the frequency shifter in accordance with this embodiment.

The temperature detecting element 20 attached to the thermal conductor 19 detects temperature data of the electro-optic elements 15a, 15b. This item of temperature data are converted by the A/D converter 21 into digital data and then taken in the CPU 22. The CPU 22 obtains a serodyne voltage for uniformizing the phase variations of the light per unit time from the formula (8) as well as from the temperature dependences of the refractive index N$_e$ and of the Pockels constant $\gamma_{33}$ of the electro-optic elements 15a, 15b that are stored therein. The CPU 22 calculates a multiple of the obtained drive voltage value with respect to a standard drive voltage, and the D/A converter 23 analog-converts this multiple. Then, the multiplier 25 performs a multiplication of the multiple for the uniform serodyne waveform generated from the serodyne waveform generator 24, and the serodyne drive of the electro-optic elements 15a, 15b is effected under a voltage to be obtained. The temperatures of the electro-optic elements 15a, 15b are thereby compensated.

As discussed above, in accordance with this embodiment, on the basis of the temperature data given from the temperature detecting element 20, the serodyne drive circuit compensates a voltage amplitude, makes the phase variation of the light constant even when the temperatures of the electro-optic elements 15a, 15b change and sets the voltage amplitude to a value corresponding to the optical phase 2 π.

Figure 6:
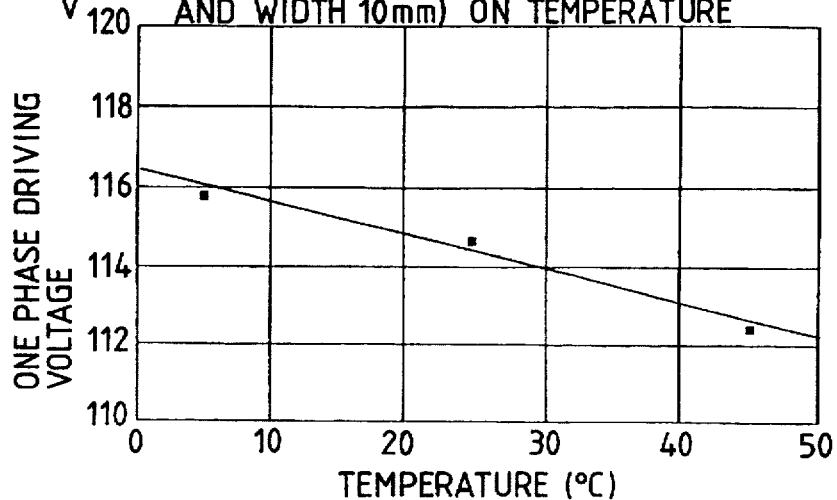
FIG. 6 is a diagram showing the temperature dependency of an applied voltage value to the electro-optic crystal, which corresponds to an optical phase 2 π.

Note that the temperatures are, as explained above, compensated based on the formula (8) as well as on the temperature characteristic among the characteristics of the electro-optic elements in this embodiment but may be otherwise compensated, which involves a test for obtaining a voltage value corresponding to the optical phase 2 π by varying the temperatures of the electro-optic elements 15a, 15b and the measured values thereof are utilized therefor. FIG. 6 shows a measured result of the test for the temperature characteristic of the voltage value corresponding to the optical phase 2 π with respect to the electro-optic element composed of LiNbO$_3$ in which the thickness d=1 mm, the length a=20 mm, and the width is 10 mm.

FIG. 7 is an explanatory diagram of the frequency shifter in a second embodiment of the present invention. A different point of the second embodiment from the first embodiment is only the construction of the frequency shifter, but other configurations are the same. Therefore, the explanation thereof will be omitted.

According to the frequency shifter in the second embodiment, instead of the temperature detecting element 20 in the first embodiment, there is constructed a serodyne drive circuit exhibiting such a temperature characteristic as to compensate the temperature dependences of the refractive index $N_e$ and the Pockels constant $\gamma_{33}$ of the electro-optic elements 15a, 15b, the variations in the optical phase are uniformized, and the voltage amplitude is set to a value corresponding to the optical phase 2 π.

Figure 7A:
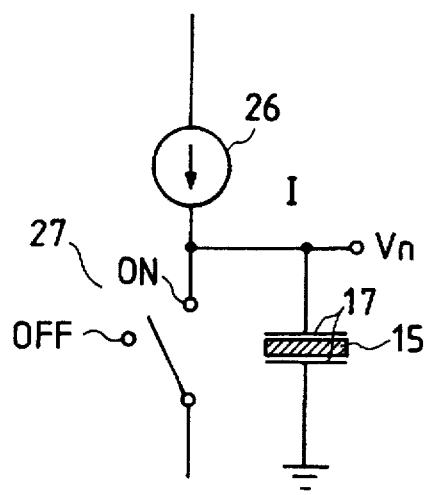
FIG. 7A is an explanatory diagram schematically illustrating the principal portion of the frequency shifter in a second embodiment of the present invention.

FIG. 7A is a diagram schematically illustrating the principal portion of the phase shifter in the second embodiment. Referring to FIG. 7A, the numeral 26 represents a constant current circuit, and 27 designates a switching circuit.

The operation of the second embodiment will be explained. In the embodiment, the serodyne drive circuit is constructed of the constant current circuit 26 and the switching circuit 27, wherein the electro-optical element serves as a capacity load. Then, a predetermined current (i) flows from the constant current circuit 26 by turning OFF the switching circuit 27. Electric charges stay in the electro-optic element sandwiched between electrodes 17a, 17b, whereby the electric field rises. When it reaches a given voltage, the switching circuit is turned ON, thereby discharging the electric charges down to a zero-voltage between the two electrodes. Thus, the electric charges are charged and discharge at the two edges of the electro-optic elements 15a, 15b, thereby performing the serodyne drive as shown in FIG. 7B.

There will be explained the fact that the voltage value for the serodyne drive of the electro-optic elements 15a, 15b can be made corresponding to the predetermined optical phase by the operation described above.

Figure 8:
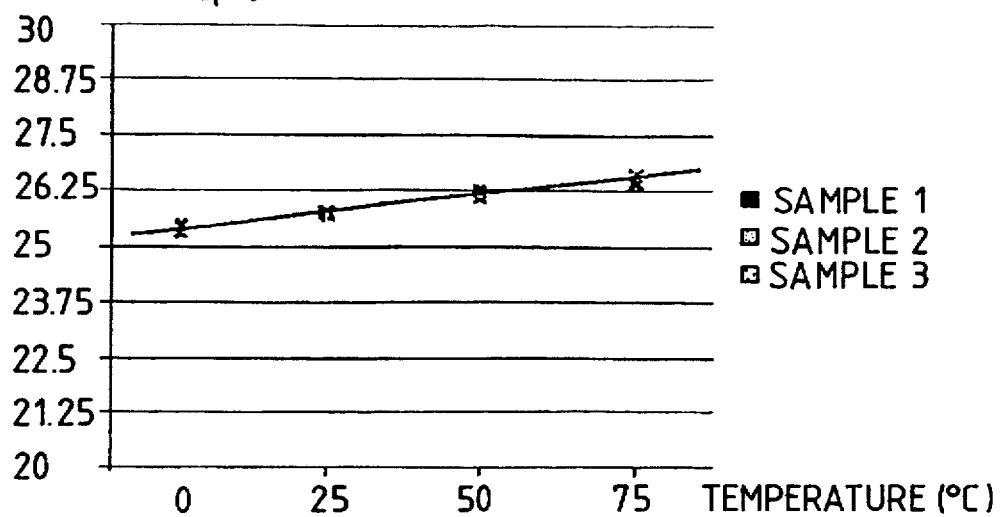
FIG. 8 is a diagram showing the temperature dependency of a capacitance value of the electro-optic crystal (2 mm in thickness, 20 mm in length and 10 mm in width) of $LiNbO_3$.

It has proven that the electro-optic crystal is electrically an insulating substance and has only a capacitance component. When the thickness (d) of the electro-optic element of LiNbO$_3$ is set to 2 mm (d=2 mm) the length (a) thereof is set to 20 mm (a=20 mm) and the width thereof is set to 10 mm, it has proven from a test that the capacitance value thereof exhibits the temperature dependence shown in FIG. 8. As shown in FIG. 8, the capacitance value has fluctuations of ±1.8% at temperatures of 0° to 50° C., and, when the temperature decreases, the electric capacitance increases. Further, it has also proven from the test that the voltage value corresponding to the optical phase 2 π exhibits the temperature dependence shown in FIG. 6. As shown in FIG. 6, this voltage value has fluctuations of ±1.5% at the temperatures of 0° to 50° C., and, when the temperature rises, the voltage value decreases.

Figure 7B:
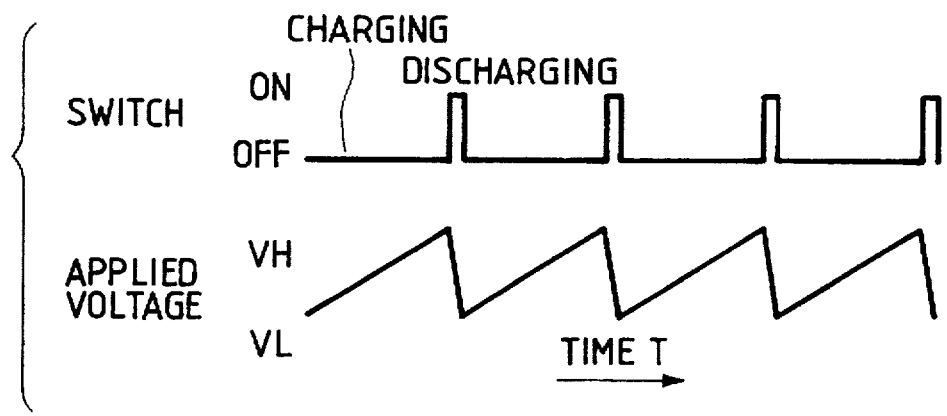
FIG. 7B is an explanatory diagram of the serodyne drive.

Hence, according to the Coulomb's law Q=CV, the predetermined current (i) flows to the constant current circuit 26, and, as shown in FIG. 7B, when the switching circuit 27 is turned ON/OFF with a predetermined period, the voltage value for the serodyne drive can be restrained down to fluctuations of 0.3% at the temperatures of 0° to 50° C. by offsetting each other the temperature dependences of the electrooptic elements 15a, 15b.

Figure 9:
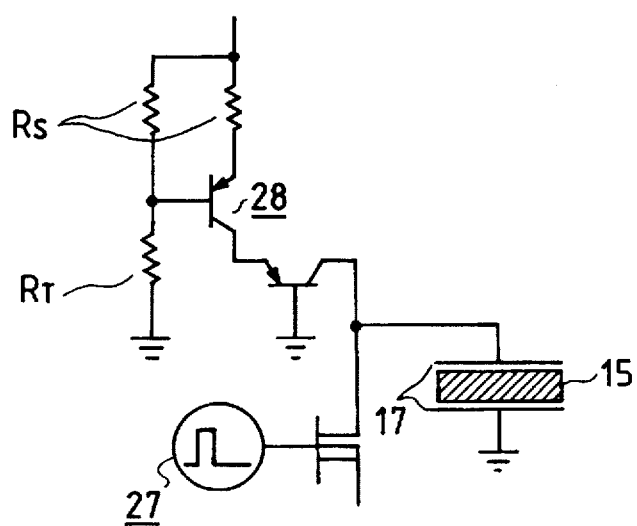
FIG. 9 is an explanatory diagram illustrating the principal portion of the frequency shifter in a third embodiment of the present invention.

FIG. 9 is a diagram schematically illustrating the frequency shifter in a third embodiment of the present invention. This third embodiment is a further improved version of the second embodiment. A different point from the second embodiment is only the construction of the frequency shifter, but other configurations are the same. Hence, the explanation thereof will be omitted.

According to the frequency shifter in the third embodiment, some resistances in the construction of the constant current circuit of the serodyne drive circuit in the second embodiment involve the use of resistances for compensating the temperature and precise resistance in which resistance values thereof are stable against the temperature.

Referring to FIG. 9, the numeral 28 denotes a constant current circuit, and $R_S$ represents a precise resistance. A temperature compensating resistance designated by $R_T$ is constructed of, e.g., a thermistor and so disposed as to be closely fitted to the electro-optic elements 15a, 15b. The temperature compensating resistance $R_T$ serves as a temperature detecting element.

The operation in the third embodiment will be explained. In accordance with the third embodiment, basically as in same way with the second embodiment, the constant current circuit and the switching circuit makes the temperature dependences of the electro-optic elements offset each other. As discussed in the second embodiment, it follows that this also causes the 0.3% fluctuations which are to remain. In the third embodiment, the thermistor and the precise resistance are combined by way of the temperature compensating resistance $R_T$, and the temperature dependence is further given to the current of the constant current circuit 28 in accordance with the temperatures of the electrooptic elements 15a, 15b, thus performing the temperature compensation in a more elaborate manner.

In the embodiments discussed above, the temperature data detecting element (temperature detecting element) involves the use of the thermistor, etc. In addition to that, however, the electronic elements such as a resistor, a capacitor, a transistor, an OP amp, and a diode which have temperature dependence may be used as temperature data detecting element.

Figure 10:
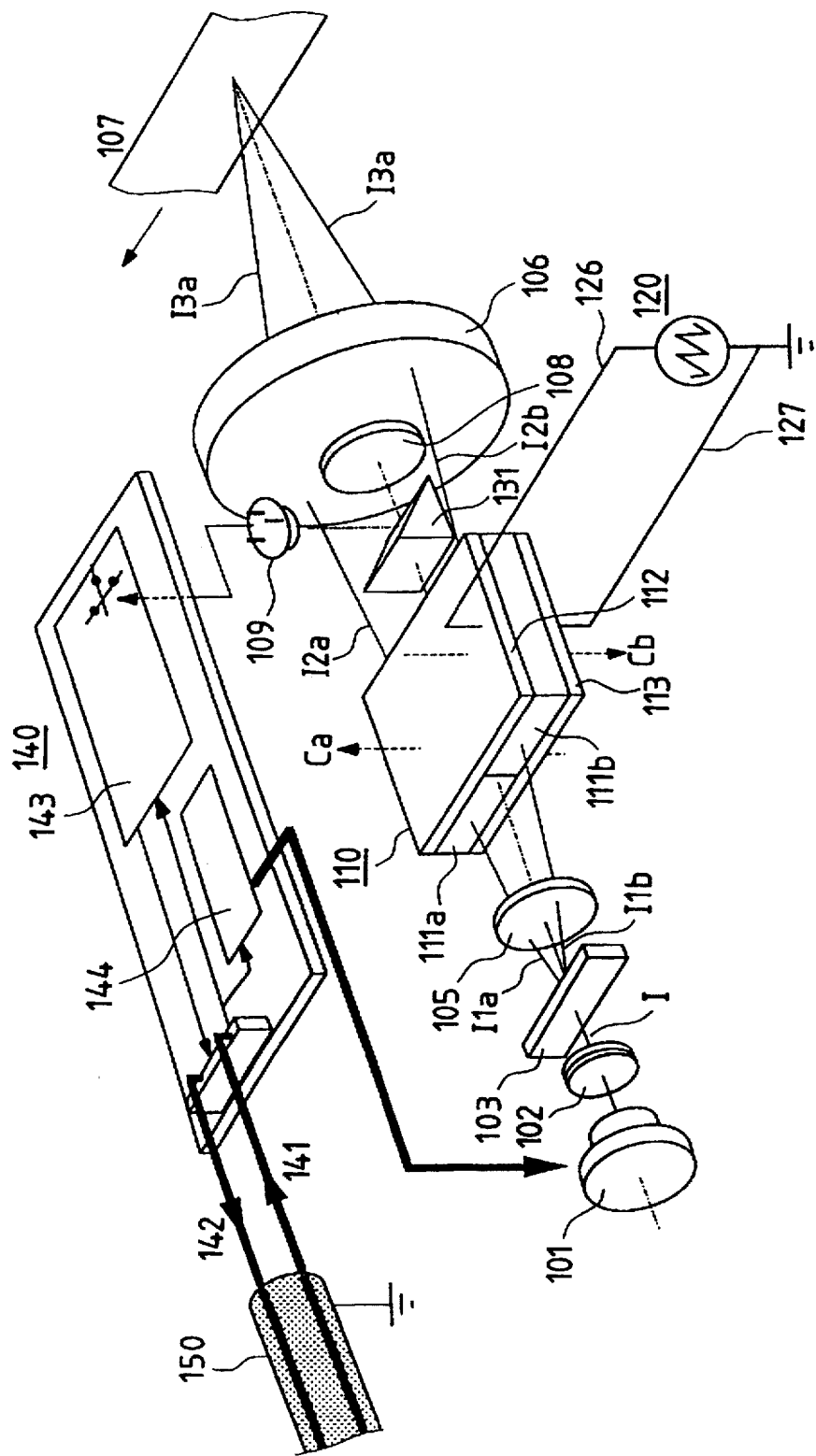
FIG. 10 is an explanatory view illustrating a laser Doppler velocimeter incorporating the optical frequency shifter of an electro-optic element in a fourth embodiment of the present invention.

FIG. 10 is an explanatory view illustrating an arrangement of members constituting the laser Doppler velocimeter in a fourth embodiment of the present invention. Referring to FIG. 10, there are shown a laser diode 101, a collimator lens 102, a beam splitter 103 composed of a diffraction grating, convex lenses 105, 106, an object 107 to be measured, a condenser lens 108, an optical sensor 109, a frequency shifter 110, electro-optic elements 111a, 111b, electrodes 112, 113, a serodyne drive circuit 120 and an electric board.

Referring again to FIG. 10, the laser beams emitted from the laser 101 and are collimated by the collimator lens 102 into parallel beams I. The parallel beams I are perpendicularly incident on the diffraction grating 103 and split into ±1st-order diffracted light beams, thus emerging therefrom. The light beams IIa, IIb pass through the convex lens 105 having a focal length (f) and turn out convergent beams I2a, I2b as illustrated in FIG. 10. The electro-optic element 110 including the electro-optic crystals 11a, 11b is so disposed that the two light beams I2a, I2b penetrate the electro-optic crystals 11a, 11b each corresponding thereto.

Figure 1A:
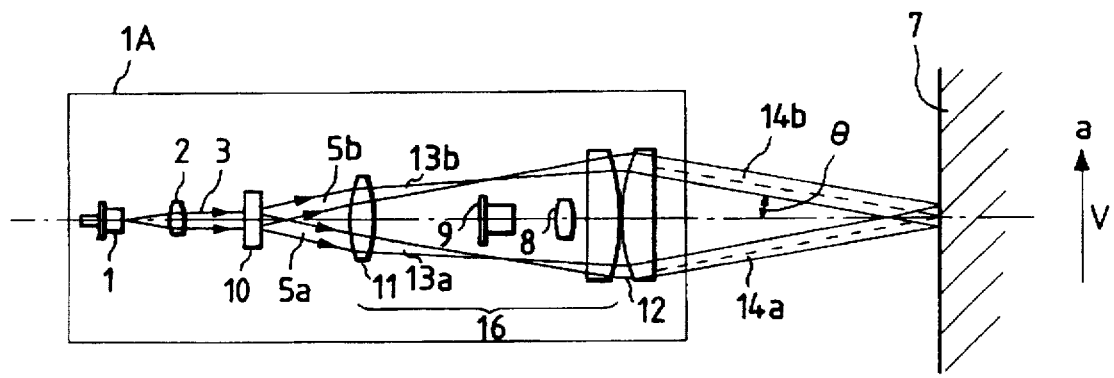
FIG. 1A is a diagram schematically illustrating the principal portion of a prior art laser Doppler velocimeter.
Figure 1B:
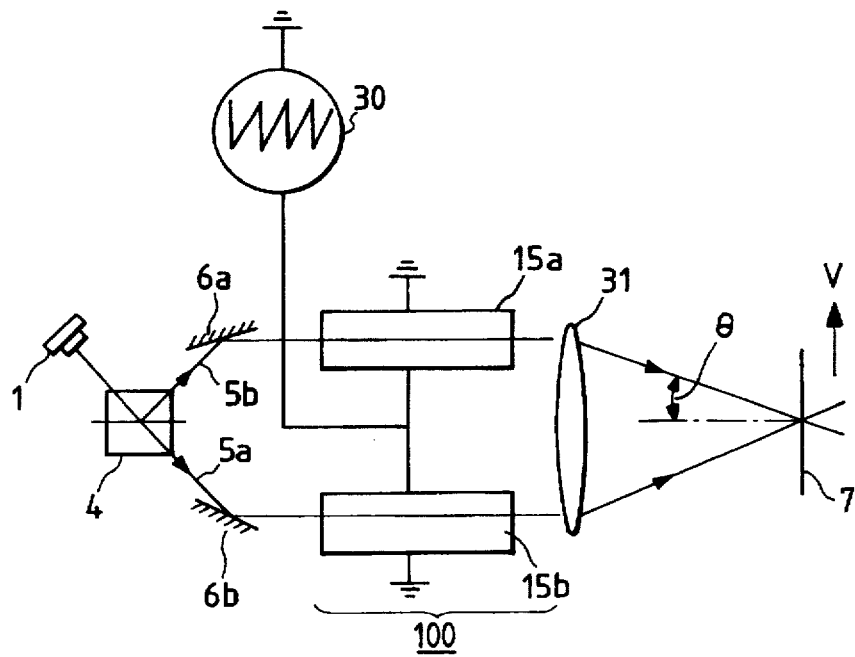
FIG. 1B is a diagram schematically illustrating the laser Doppler velocimeter using a conventional frequency shifter.

The electro-optic crystals 111a, 111b involve the use of optically-uniaxial crystals such as $LiNbO_3$ and $LiTaO_3$, wherein the electrodes are disposed in a C-axis direction, and a deflecting direction of the laser beams is set in the c-axis direction. With this arrangement, the diffraction angle θ of the diffraction grating 103 changes due to variations in terms of wavelength of the laser beam, and, even if the optical path within the electro-optic crystal is thereby varied, the deflecting direction remains set in the C-axis direction. Accordingly, the frequency shifter is compatible with the effect of compensation for variations in the laser wavelength of the Doppler frequency that has been explained in FIG. 1.

An explanation will hereinafter be given by exemplifying $LiNbO_3$. An index ellipsoid of $LiNbO_3$ in a state where electric fields E (Ex, Ey, Ez) are applied can be expressed as follows:

$$(1/no^2 - r22Ey + r13Ez)X^2 + (1/no^2 + r22Ey + r13Ez)Y^2 + \quad (9)$$
$$(1/ne^2 + r33Ez)Z^2 - 2r22ExXY + 2r51EyYX + 2r51ExZX = 1$$

Figure 11:
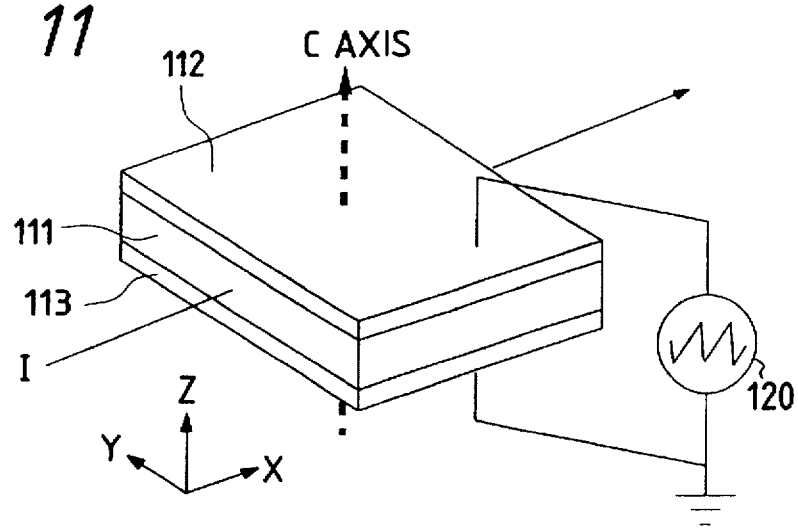
FIG. 11 is an explanatory view showing the optical frequency shifter of the electro-optic element.

As illustrated in FIG. 11, the $LiNbo_3$ crystal is cut to a thickness (d) in the Z-axis (C-axis) direction, and electrodes are deposited on both surfaces of the electro-optic crystal 111. When an electric field given by Ez=V/d is applied across the electro-optic crystal 111 (Ez≠0, Ex=Ey=0) from the electrodes 112, 113, the formula (9) goes as follows:

$$(1/no^2+r13Ez)(X^2+Y^2)+(1/ne^2+r33Ez)Z^2=1 \quad (10)$$

where r is the Pockels constant (r13=10×10⁻⁹, r22=6.8×10⁻⁹, r33=32.2×10⁻⁹, r51=32.0×10⁻⁹), and no, ne are the refractive indexes (no=2.286, ne=2.2) of the ordinary and extraordinary rays.

$No^2 r13Ez$, $ne^2 r33Ez \ll 1$, and hence the formula (10) is simplified into:

$$\frac{X^2+Y^2}{no^2(1-no^2 r13Ez/2)} + \frac{Z^2}{ne^2(1-ne^2/2+r33Ez)} = 1 \quad (11)$$

Accordingly, the refractive indexes nx, ny of the polarized light components in the X- and Y-axis directions are given by:

$$nx=ny=no-\tfrac{1}{2}\cdot no^3 r13Ez$$

The refractive index nz of the polarized light component in the Z-axis direction is given by:

$$nz=ne-\tfrac{1}{2}\cdot ne^3 r33Ez$$

The X-Y plane is selected as light propagating directions, and the Z-axis direction is selected as the polarizing direction. In this case, owing to the electric field Ez applied in the Z-axis direction, the refractive index N(Ez) is expressed such as:

$$N(Ez)=nz=ne-\tfrac{1}{2}\cdot ne^3 r33Ez \quad (12)$$

Accordingly, when the laser beams penetrate $LiNbO_3$ having the thickness (d) and the length (l) under the above conditions, the applied voltage is V-changed. As a result, the optical phase difference Γ(V) is given by:

$$\Gamma(V) = (2\pi/\lambda)\{n(V/d) - N(0)\} \times l = -\frac{\pi ne^3 r33 l \cdot V}{\lambda d} \quad (13)$$

Hence, when the applied voltage is uniformly changed, the variations in the optical phase are also uniformized. That is, this turns out to be the frequency shifter. As a matter of fact, since the voltage can not be changed uniformly at all times, the serrate wave (serodyne) drive is carried out. With respect to the serrate wave, a phase difference between the two light beams is set to a voltage amplitude corresponding to 2 π so that the optical phase does not become discontinuous at the fall.

Herein, if the $LiNbO_3$ crystal has a thickness given by d=1 mm and a length given by l=2 mm, from the formula (12), a voltage amplitude wherein the optical phase difference Γ(v) is 2 π is given such as V≅230 V.

Turning attention to FIG. 10, the C-axes Ca, Cb of the electro-optic crystals 111a, 111b are disposed opposite to each other in the Z-axis direction, and the electrodes 112, 113 apply voltages en bloc to both of them in the same direction via conductors 126, 127 from a serodyne drive circuit 120. With such an operation, a voltage amplitude of the serrate wave according to the formula (13) can be reduced down to a half of the voltage amplitude corresponding to 2 π. That is, with a voltage amplitude giving a phase difference A, an optical phase difference between the light beams I2a, I2b that have passed through the electro-optic element 110 can be set to 2 π. In this case, the voltage amplitude required is approximately 115 V.

Referring back to FIG. 10, the light beams I2a, I2b modulated in phases opposite to each other by the electro-optic element 110 become parallel light beams I3a, I3b through the convex lens 106. Then, the measured object 107 moving at the velocity V is irradiated with two light fluxes at an incident angle θ equal to the diffraction angle θ by the diffraction grating 103. Scattered beams from the measured object 107 are condensed at the optical sensor 109 of the electric board 140 via a mirror 131. These scattered beams I3a, I3b are subjected to a Doppler shift proportional to the moving velocity of the measured object 107 and also a frequency modulation by the frequency shifter constructed of the electro-optic element 110 and the serodyne drive circuit 120. A frequency F thereof is given by the following formula (14):

$$F = 2 \cdot V \cdot \sin\theta/\lambda + fR = 2 \cdot V/d + fR \quad (14)$$

where λ is the wavelength of the laser beam, fR is the frequency modulation by the frequency shifter, and d is the grating interval of the diffraction grating.

The electronic board 140 packaged with the optical sensor 109 also packages, in addition to this, a power supply line 141 extending from the outside, a signal line 142 for transmitting signals to the output side, an amplifier circuit 143 for amplifying an output of the optical sensor and a laser drive circuit 144 for controlling the laser diode 101 to a fixed output. The lines 141, 142 are covered with an earthed netted-shield 150.

A detection signal obtained from the optical sensor is amplified by the amplifier circuit 143 and transmitted to an outside signal processor via the signal line 142. The outside signal processor calculates the moving velocity V of the measured object 7 from the frequency F on the basis of the formula (14). The signal processing has been already known, and hence its explanation will be omitted.

Figure 12A:
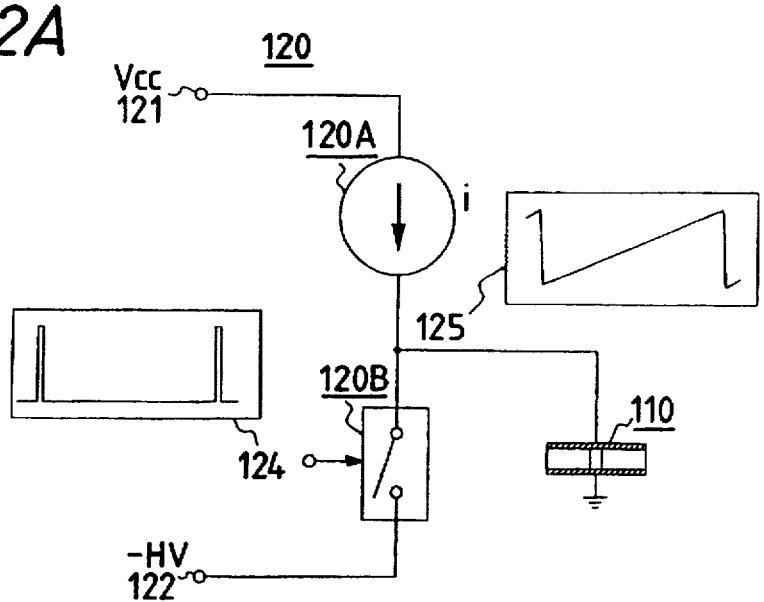
FIGS. 12A and 12B are block diagrams showing the serodyne (serrate wave) drive.

On the other hand, FIG. 12A is a block diagram showing one example of the serodyne drive circuit 120 for applying the serrate wave to the electro-optic element 110.

In accordance with this embodiment, the serodyne drive circuit comprises a constant current circuit 120A and a discharging circuit 120B. The constant current circuit 120A flows the constant current (i) to the electrode of the frequency shifter 110 that is conceived to have fixed capacitance, thus charging it with the electricity.

The discharging circuit 120B instantaneously turns "ON" the switch at rather short pulses 124 with a fixed period and thus instantaneously discharges the electrooptic element 110 charged with the electricity by the constant current circuit 120A. Accordingly, with repetitions of the instantaneous charging and discharging processes, the serodyne drive takes place with the fixed period.

Figure 13:
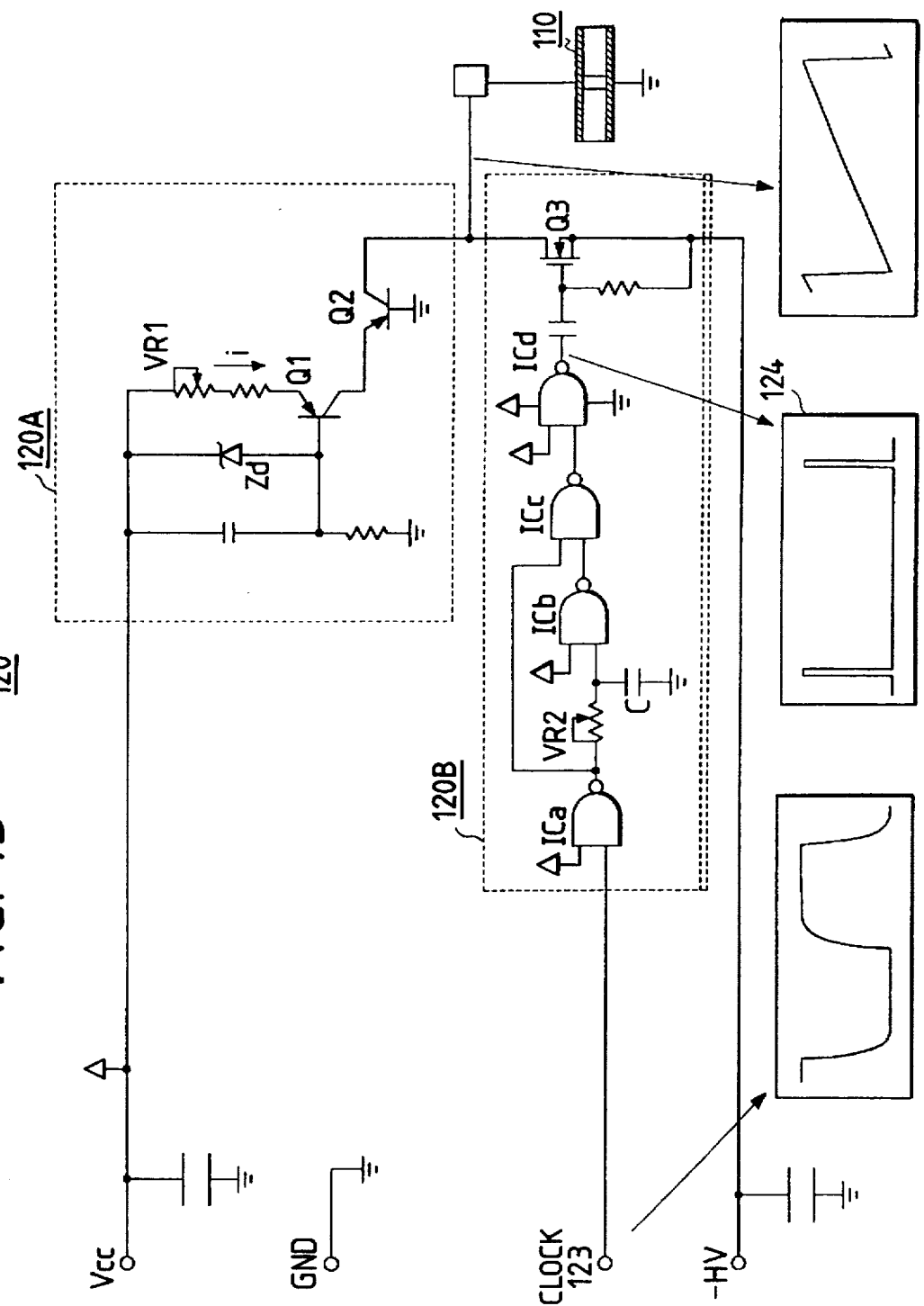
FIG. 13 is an explanatory circuit diagram of a serodyne drive circuit.

FIG. 13 is a circuit diagram illustrating the serodyne drive circuit used in this embodiment. The constant current circuit 120A is constructed of a variable resistance VR1, a transistor Q1 and a Zener diode Zd. The constant current circuit 120A supplies the constant current (i) adjusted by the variable resistance VR1 to the electro-optic element 110 conceived to have the fixed capacitance through the transistor Q2 or increasing an output impedance. The discharging circuit 120B generates the very short pulses 124 by use of a delay circuit constructed of a variable resistance VR2 and a capacitor C at the fall of an inputted clock signal from a clock 123 inputted from a transmitter or the like. The discharging circuit 120B instantaneously switched "ON" a switching transistor Q3 by use of this pulse and discharges the electro-optic element charged with the electricity by the constant current circuit 120A down to approximately a source voltage–HV of the switching transistor Q3. Accordingly, with the repetitions of the charging and discharging processes, the serodyne drive is performed with a clock signal period of the input clock 123. A pulse width of the pulse 124 is adjusted by the variable resistance VR2.

Figure 12B:
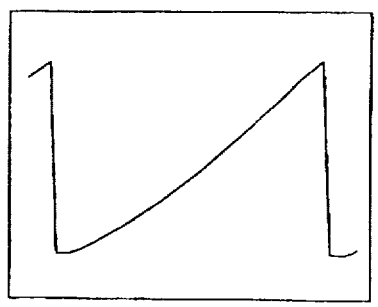

In the above circuit, the switching transistor Q3 preferably has a large pulse current capacitance and is high in terms of a switching speed. For modularizing the drive circuit 120 and the electro-optic element 110, a downsized surface packaging element is desirable. A high-speed and downsized switching element generally involves the use of a transistor. However, if the discharging is effected while saturating the transistor, the serrate wave signal to the electro-optic element 110 of FIG. 12A, as illustrated in FIG. 12B, worsens in terms of a linearity at the rise subsequent to the discharging. Further, when using an unsaturated area of the transistor to avoid this, an environment temperature and a signal voltage for discharging tend to be unstable.

Figures 14A, 14B:
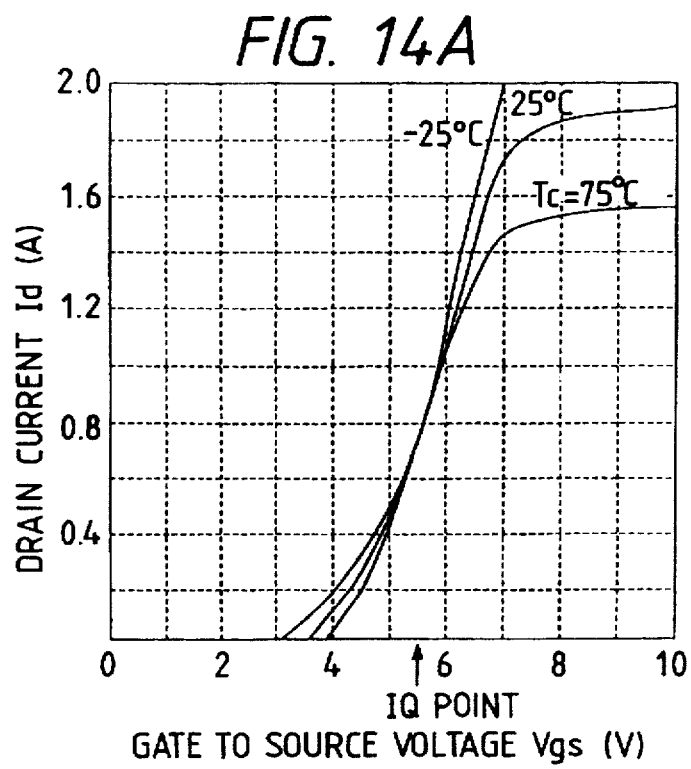
FIGS. 14A and 14B are explanatory diagrams showing circuit characteristics.

FIG. 14A shows a characteristic of a drain voltage versus a gate voltage of a FET transistor serving as the switching transistor Q3 in this embodiment. This is 2SK1334 (made by Hitachi, Ltd.) used in this embodiment. According to the apparatus in this embodiment, a point, i.e., an IQ point where the gate voltage/drain current characteristic curves depending on the environment temperatures intersect each other is set to a voltage (about 5.5 V) of the above switching pulse 124. Switching can be thereby effected stably against the environment temperature, and hence the serodyne drive high stable against the environment can be performed.

Further, the logic integrated circuits ICa–ICd involve the use of high-speed logic IC, TC74ACOOF (made by Toshiba Co., Ltd.) capable of directly driving the FET transistor.

FIG. 14B shows an environment temperature characteristic of the serodyne drive when the voltage of the above-mentioned switching pulse 124 changes at the IQ point and points anterior and posterior thereto. FIG. 14B shows a peak just before the discharging of the serrate wave of the serodyne drive and a bottom just thereafter. The adjustment is effected at 25° C. while changing the pulsresistance VR2 but fble resistance VR2 but falls within a pulse width range of 20 nsec–25 nsec with respect to the serodyne frequency 200 kHz.

It can be understood from FIG. 14B that the voltage of the switching pulse 124 is set to a gate voltage of the IQ point by use of the FET transistor as a switching element, and the serodyne drive stable against the environment temperatures can be conducted.

Figure 15A:
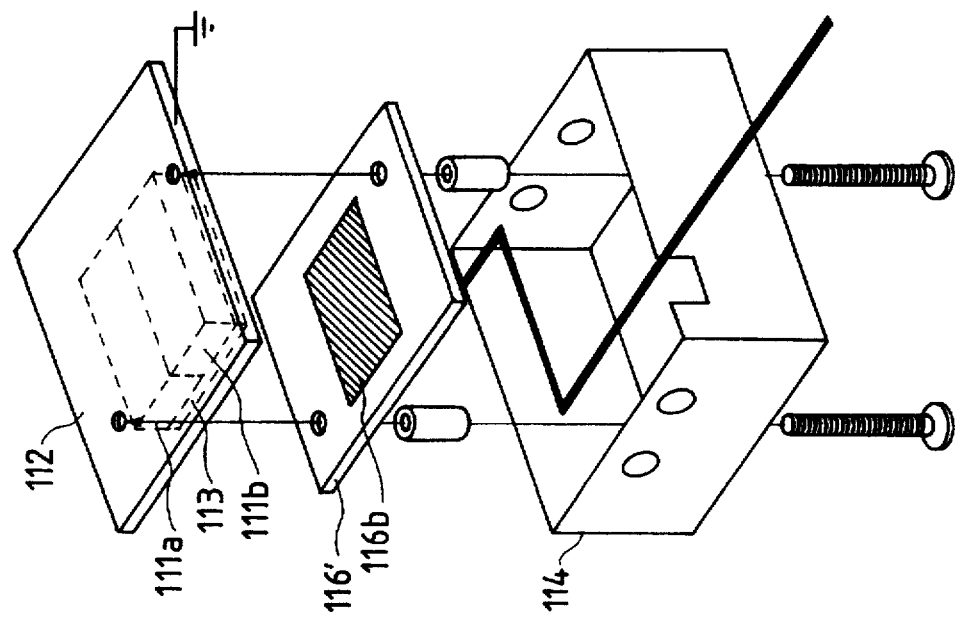
FIGS. 15A and 15B are explanatory views each illustrating a modified embodiment of a frequency shifter module.
Figure 15B:
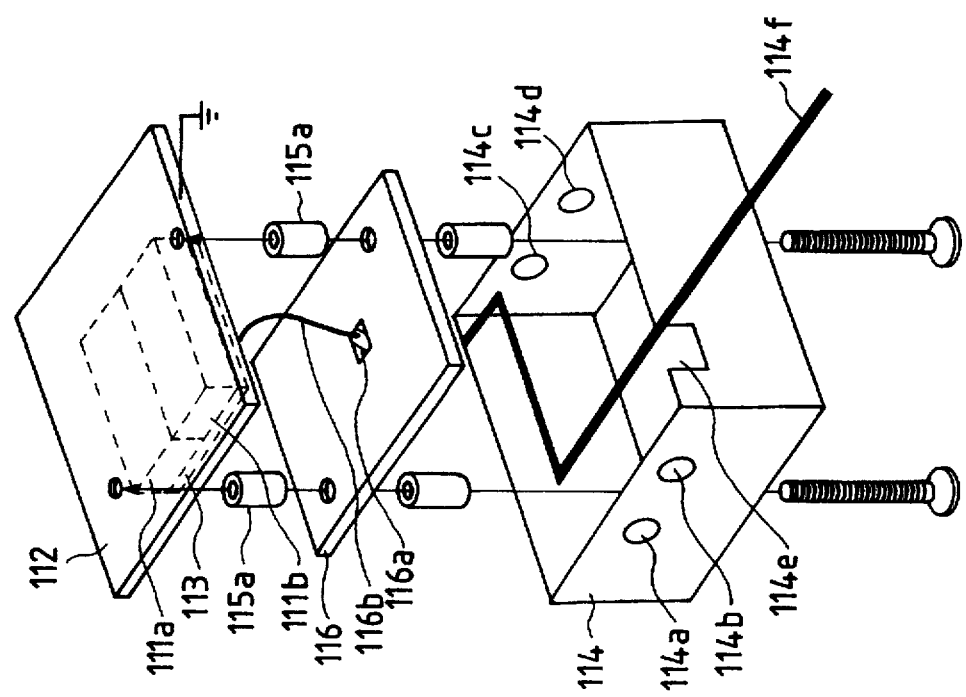

FIGS. 15A and 15B illustrate partially modified embodiments of this embodiment. FIGS. 15A and 15B are explanatory views of the modified embodiments wherein the serodyne circuit and the electro-optic element 110 are formed into one united body and thus modularized. The configurations of other portions are the same as those in the fourth embodiment, and hence, the explanation thereof will be omitted. Referring to FIG. 15A, the serrate waves are supplied to the electrooptic element 110 via a lead wire 116b. Referring to FIG. 15B, the serrate waves are supplied to the electro-optic element 110 while being directly brought into contact with the electrode 113.

FIG. 15A illustrates a construction wherein the circuit board 116 packaged with the serodyne drive circuit 120 on its surface is laminated via spacers 115a, 115b, and the serrate waves are supplied to the electrode 113 via the short lead wire 116b from a pad 116a provided on the side of the electrode 113.

The electro-optic element 110 and the serodyne drive circuit board 116 are shielded by the ground-side electrode 112 of the electro-optic element 110 and a cover 114 composed of a conductor but formed with openings 114a–114d for the light beams and an opening 114e for a cord for the clock 123 which will be mentioned later as well as for the power supply in FIGS. 14A and 14B.

Referring to FIG. 15B, a serodyne drive circuit board 116' is packaged with the respective elements of the serodyne drive circuit on one surface thereof and then laminated, and an electrode 116c for supplying the serrate waves is provided on the other surface of the serodyne drive circuit board 116'. The electrode 116c is plated with gold substantially corresponding to a size of the electrode 113 of the electro-optic element 110 and directly contacts the electrode 113 of the electro-optic element 110 by fasting a screw, thus supplying the serrate waves. The electrode contacting the electrode 113 on the circuit board is plated as described above, whereby the configuration within the case can be further downsized. This leads to further downsizing of the apparatus.

The electro-optic element 110 and the serodyne drive circuit board 116 are shielded by a conductor cover 114 having an opening for a cord of the clock 123 and an opening power supply for the light beams and by the ground-side electrode 112 of the electro-optic element 110.

Figure 16:
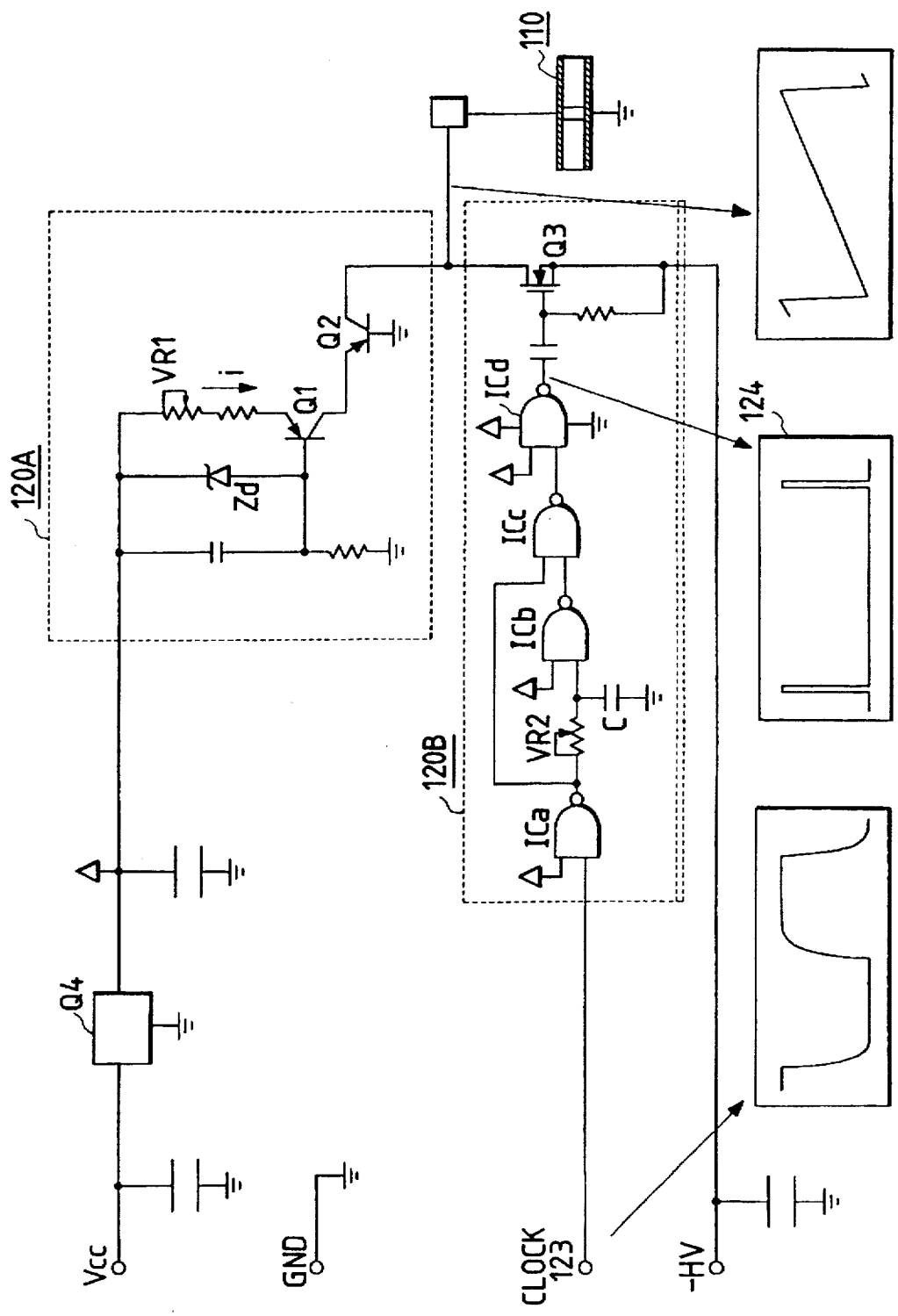
FIG. 16 is an explanatory diagram illustrating other embodiment of the present invention.

FIG. 16 is an explanatory diagram showing an embodiment using the serodyne drive circuit useful for the modularized frequency shifter.

Configurations of a constant current circuit 120A and a discharging circuit 120B are the same as those in FIG. 13, but the voltage supplied to the constant current circuit 120A and the discharging circuit 120B takes such a form as to be supplied thereto via a voltage regulator Q4.

A switching transistor Q3 is used in an analog area and therefore sensitive to the voltage of the switching pulse 124. Accordingly, even when the voltage of the switching pulse 124 slightly changes with variations in the supplied voltage, the variable resistance VR2 is required to be readjusted. Since a power supply of the circuit (logic IC: ICa–ICd) constituting the switching pulse 112 does not change, there is no necessity for readjusting the variable resistance VR2. Therefore, this is effective especially in a construction wherein the internal circuit is hard to adjust due to the modularization.

The voltage regulator involves the use of a downsized and surface packaging type of three-terminal regulator, XC62AP5502M (made by Trrec Semiconductor Corp.).

Referring to FIG. 16, the power supply of the constant current circuit 120A is also obtained from the voltage regulator Q4, and there is absolutely no change in the constant current (i), thereby making it possible to uniformize the amplitudes of the serrate waves.

It is apparent that, in this invention, a wide range of different working modes can be formed based on the invention without deviating from the spirit and scope of the invention. This invention is not restricted by its specific working modes except being limited by the appended claims.

What is claimed is:

1. A frequency shifter for shifting a frequency of an incident light beam, comprising:
    an electro-optic element for making incident the light beam whose frequency is to be shifted;
    an electrode unit disposed on said electro-optic element;
    an electric charge imparting circuit for imparting an electric charge to said electrode unit; and
    a discharging circuit for discharging the electric charges accumulated in said electrode unit, said discharging circuit instantaneously performing the electrical discharging to restart electric charging of said electrode unit by said electric charge imparting circuit.

2. The frequency shifter according to claim 1, wherein said discharging circuit executes the discharging of the electric charge at an interval of a fixed time.

3. The frequency shifter according to claim 1, wherein said electric charge imparting circuit has a constant current circuit.

4. The frequency shifter according to claim 3, wherein said discharging circuit has a switching element.

5. The frequency shifter according to claim 4, wherein said switching element is a FET transistor.

6. A frequency shifter for shifting a frequency of an incident light beam, comprising:
    an electro-optic element for making incident the light beam whose frequency is to be shifted;
    an electrode unit disposed on said electro-optic element;
    an electric charge imparting circuit for imparting an electric charge to said electrode unit, said electric charge imparting circuit comprising a constant current circuit;
    a discharging circuit for discharging the electric charges accumulated in said electrode unit, said discharging circuit comprising a switching element in turn comprising an FET transistor;
    wherein a voltage of a switching signal of said switching element is set substantially at an IQ point of said FET transistor.

7. The frequency shifter according to claim 3, wherein said discharging circuit has a voltage supplying unit for generating the switching signal for discharging and a poser supply regulator provided in said voltage supplying unit.

8. The frequency shifter according to claim 7, wherein said discharging circuit has a switching element constructed of a FET transistor, and a voltage of a switching signal of said switching element is set substantially at an IQ point of said FET transistor.

9. An apparatus for optically measuring relative displacement data to an object to be measured, said apparatus comprising:
    a light source for generating a light beam for a measurement, which is incident on the object to be measured; and
    a frequency shifter for shifting a frequency of the measurement light beam emitted from said light source,
    said frequency shifter comprising:
        I) an electro-optic element for making the measurement light beam incident;
        II) an electrode unit provided on said electro-optic element;
        III) an electric charge imparting circuit for imparting an electric charge to said electrode unit; and
        IV) a discharging circuit for discharging the electric charges accumulated in said electrode unit, said discharging circuit instantaneously performing the electrical discharging to restart electric charging of said electrode unit by said electrical charge imparting circuit,
    wherein a light receiving unit receives the light beam from the measured object irradiated with the measurement light beam, thereby measuring the relative displacement data to the measured object.

10. The apparatus according to claim 9, wherein said discharging circuit executes the discharging of the electric charge at an interval of a fixed time.

11. The apparatus according to claim 9, wherein said electric charge imparting circuit has a constant current circuit.

12. The apparatus according to claim 11, wherein said discharging circuit has a switching element.

13. The apparatus according to claim 12, wherein said switching element is a FET transistor.

14. An apparatus for optically measuring relative displacement data to an object to be measured, said apparatus comprising:
    a light source for generating a light beam for a measurement, which is incident on the object to be measured; and
    a frequency shifter for shifting a frequency of the measurement light beam emitted from said light source,
    said frequency shifter comprising:
        I) an electro-optic element for making the measurement light beam incident;
        II) an electrode unit provided on said electro-optic element;
        III) an electric charge imparting circuit for imparting an electric charge to said electrode unit, said electric charge imparting circuit comprising a constant current circuit; and
        IV) a discharging circuit for discharging the electric charges accumulated in said electrode unit, said discharging circuit comprising a switching element, said switching element in turn comprising an FET transistor, wherein a light receiving unit receives the light beam from the measured object irradiated with the measurement light beam, thereby measuring the relative displacement data to the measured object, wherein a voltage of a switching signal of said switching element is set substantially at an IQ point of said FET transistor.

15. The apparatus according to claim 11, wherein said discharging circuit has a voltage supplying unit for generating the switching signal for discharging and a power supply regulator provided in said voltage supplying unit.

16. An apparatus for optically measuring relative displacement data to an object to be measured, said apparatus comprising:

a light source for generating a light beam for measurement, which is incident on the object to be measured;

a frequency shifter for shifting a frequency of the measurement light beam emitted from said light source, said frequency shifter comprising:

I) an electro-optic element for making the measurement light beam incident;

II) an electrode unit provided on said electro-optic element;

III) an electric charge imparting circuit for imparting an electric charge to said electrode unit, said electric charge imparting circuit comprising a constant current circuit; and IV) a discharging unit for discharging the electric charges accumulated in said electrode unit, wherein a light receiving unit receives the light beam from the measured object irradiated with the measurement light beam, thereby measuring the relative displacement data to the measured object; and light beam splitting means for generating a second measurement light beam from the former measurement light beam, wherein said frequency shifter shifts a frequency of the second measurement light beam together with the former measurement light beam, and said light receiving unit receives light beam from the measured object irradiated with the second measurement light beam and the former measurement light beam as well.

17. A frequency shifter for shifting a frequency of an incident light beam, comprising:

an electro-optic element for making incident the light beam whose frequency is to be shifted;

an electrode unit provided on said electro-optic element; and an electric field applying circuit for applying an electric field to said electro-optic element via said electrode unit, said electric field applying circuit controlling the electric field applied to said electro-optic element by use of a switching circuit, said electric field applying circuit instantaneously performing electrical discharging to restart electrical charging by way of said electrode unit.

18. The frequency shifter according to claim 17, wherein said switching circuit has a FET transistor.

19. A frequency shifter for shifting a frequency of an incident light beam, comprising:

an electro-optic element for making incident the light beam whose frequency is to be shifted;

an electrode unit provided on said electro-optic element;

an electric field applying circuit for applying an electric field to said electro-optic element via said electrode unit, said electric field applying circuit controlling the electric field applied to said electro-optic element by use of a switching circuit, said switching circuit comprising an FET transistor, wherein a voltage of a switching signal of said switching circuit is set substantially at an IQ point of said FET transistor.

20. An apparatus for optically measuring relative displacement data to an object to be measured, said apparatus comprising:

a light source for generating light beams for a measurement, which are incident on said measured object; and a frequency shifter for shifting a frequency of the measurement light beam emitted from said light source, said frequency shifter comprising:

I) an electro-optic element for making the measurement light beam incident;

II) an electrode unit provided on said electro-optic element; and

III) an electric field applying circuit for applying an electric field to said electro-optic element via said electrode unit, said electric field applying circuit controlling the electric field applied to said electro-optic element by use of a switching circuit, said electric field applying circuit instantaneously performing electrical discharging to restart electrical charging by way of said electrode unit, wherein a light receiving unit receives the light beam from the measured object irradiated with the measurement light beam, thereby measuring the relative displacement data to the measured object.

21. The apparatus according to claim 20, wherein said electric field applying circuit serodyne-drives said electro-optic element by use of said switching circuit.

22. An apparatus for optically measuring relative displacement data to an object to be measured, said apparatus comprising:

a light source for generating light beams for measurement, which are incident on the object to be measured;

a frequency shifter for shifting a frequency of the measurement light beams emitted from said light source, said frequency shifter comprising:

I) an electro-optic element for making the measurement light beam incident;

II) an electrode unit provided on said electro-optic element; and

III) an electric field applying circuit for applying an electric field to said electro-optic element via said electrode unit, said electric field applying circuit controlling the electric field applied to said electro-optic element by use of a switching circuit, wherein a light receiving unit receives the light beam from the measured object irradiated with the measurement light beam, thereby measuring the relative displacement data to the measured object; and light beam splitting means for generating a second measurement light beam from the former measurement light beam, wherein said frequency shifter shifts a frequency of the second measurement light beam together with the former measurement light beam, and said light receiving unit receives light beam from the measured object irradiated with the second measurement light beam and the former measurement light beam as well.

23. An apparatus for optically measuring relative displacement data to an object to be measured, said apparatus comprising:

a light source for generating light beam for a measurement, which are incident on said measured object;

a frequency shifter for shifting a frequency of the measurement light beam emitted from said light source, said frequency shifter comprising:

I) an electro-optic element for making the measurement light beam incident;

II) an electrode unit provided on said electro-optic element,

III) an electric field applying circuit for applying an electric field to said electro-optic element via said electrode unit; and IV) a control unit for controlling the applied electric field of said electric field applying circuit in accordance with a temperature of said electro-optic element, wherein a light receiving unit receives the light beam from the measured object irradiated with the measurement light beam, thereby measuring the relative displacement data to the measured object; and light beam splitting means for generating a second measurement light beam from the former measurement light beam, wherein said frequency shifter shifts a frequency of the second measurement light beam together with the former measurement light beam, and said light receiving unit receives light beam from the measured object irradiated with the second measurement light beam and the former measurement light beam as well.

24. An apparatus for optically measuring relative displacement data to an object to be measured, said apparatus comprising:

a light source for generating light beam for a measurement, which are incident on said measured object;

a frequency shifter for shifting a frequency of the measurement light beam emitted from said light source, said frequency shifter comprising:

I) an electro-optic element for making the measurement light beam incident;

II) an electrode unit provided on said electro-optic element;

III) an electric field applying circuit for applying an electric field to said electro-optic element via said electrode unit; and IV) a control unit for controlling the applied electric field of said electric field applying circuit in accordance with a temperature of said electro-optic element, wherein a light receiving unit receives the light beam from the measured object irradiated with the measurement light beam, thereby measuring the relative displacement data to the measured object; and a temperature detector for detecting a temperature of said electro-optic element, wherein said control unit executes the control in accordance with an output of said temperature detector.

* * * * *

UNITED STATES PATENT AND TRADEMARK OFFICE
CERTIFICATE OF CORRECTION

PATENT NO. : 5,796,470
DATED : August 18, 1998
INVENTOR(S) : Ueda et al.

It is certified that error appears in the above-identified patent and that said Letters Patent is hereby corrected as shown below:

COLUMN 2:

Line 42, "well" should read --often--;
Line 55, "Vaugham" should read --Vaughan--; and
Line 56, "136-139)" should read --L36-L39)--.

COLUMN 3:

Line 8, "phase E" should read --phase $\pi$--; and
Line 27, "stable against" should read --stably despite--.

COLUMN 4:

Line 12, "other" should read --another--;
Line 51, "etc." should read --etc., and--; and
Line 52, "keep" should read --maintain--.

COLUMN 6:

Line 11, "largely change" should read --change greatly--;
Line 14, "$\lambda_{33}$" should read --$\gamma_{33}$--;

UNITED STATES PATENT AND TRADEMARK OFFICE
CERTIFICATE OF CORRECTION

PATENT NO. : 5,796,470          Page 2 of 5
DATED      : August 18, 1998
INVENTOR(S): Ueda et al.

It is certified that error appears in the above-identified patent and that said Letters Patent is hereby corrected as shown below:

```
Line 15, "11,8, 1967" should read --vol. 11, no. 8--;
Line 16, "159-161)." should read --159-161(1967)).--;
    and
Line 64, "dependences" should read --dependencies--.
```

COLUMN 7:

```
Line 39, "dependences" should read --dependencies--;
Line 59, "discharge" should read --discharged--;
Line 64, "corresponding" should read --to correspond--;
    and
Line 66, "proven" should read --been proven--.
```

COLUMN 8:

```
Line 4,  "proven" should read --been proven--;
Line 9,  "proven" should read --been proven--;
Line 21, "dependences" should read --dependencies--;
Line 22, "electrooptic" should read --electro-optic--;
Line 34, "the" should read --for the--, and "and"
    should read --changes and--;
```

UNITED STATES PATENT AND TRADEMARK OFFICE
CERTIFICATE OF CORRECTION

PATENT NO. : 5,796,470                              Page 3 of 5
DATED      : August 18, 1998
INVENTOR(S): Ueda et al.

It is certified that error appears in the above-identified patent and that said Letters Patent is hereby corrected as shown below:

```
Line 35, "temperature." should read --temperature
   changes--;
Line 45, "same" should read --the same--;
Line 47, "dependences" should read --dependencies--;
Line 49, "0.3%" should read --±0.3%--;
Line 54, "electrooptic" should read --electro-optic--;
   and
Line 61, "amp." should read --amp--.
```

COLUMN 9:

```
Line 7,  "emitted" should read --are emitted--;
Line 15, "11a, 11b" should read --111a, 111b--;
Line 17, "11a, 11b" should read --111a, 111b--;
Line 40, "crystal" should read --crystals--;
Line 41, "111." should read --111a and 111b.--;
Line 42, "crystal 111" should read --crystals 111a
   and 111b--;
Line 47, "10⁻" should read --10⁻⁹,--; and
Line 48, "₉," should be deleted.
```

COLUMN 10:

```
Line 35, "A," should read --π,--.
```

UNITED STATES PATENT AND TRADEMARK OFFICE
CERTIFICATE OF CORRECTION

PATENT NO. : 5,796,470

DATED : August 18, 1998

INVENTOR(S) : Ueda et al.

It is certified that error appears in the above-identified patent and that said Letters Patent is hereby corrected as shown below:

COLUMN 11:

Line 18, "electrooptic" should read --electro-optic--.

COLUMN 12:

Line 10, "pulseresistance" should read --pulse width by the variable resistance--;
    Line 11, "but fble resistance VR2" should be deleted;
    Line 27, "electrooptic" should read --electro-optic--; and
    Line 52, "fasting" should read --fastening--.

COLUMN 13:

Line 4, "therefore" should read --is therefore--;
    Line 20, "uniformize" should read --make--; and
    Line 21, "waves." should read --waves uniform.--.

UNITED STATES PATENT AND TRADEMARK OFFICE
CERTIFICATE OF CORRECTION

PATENT NO. : 5,796,470
DATED : August 18, 1998
INVENTOR(S) : Ueda et al.

It is certified that error appears in the above-identified patent and that said Letters Patent is hereby corrected as shown below:

COLUMN 15:

Line 41, "light" should read --the light--.

COLUMN 17:

Line 1, "light" should read --the light--; (2nd occurrence)
and Line 8, "beam" should read --beams--.

COLUMN 18:

Line 1, "light" should read --the light--; (2nd occurrence)
and Line 8, "beam" should read --beams--.

Signed and Sealed this

Eighteenth Day of May, 1999

Attest:

Q. TODD DICKINSON

*Attesting Officer*   *Acting Commissioner of Patents and Trademarks*